No. 818,430. PATENTED APR. 24, 1906.
H. FREDRICK.
WATER METER.
APPLICATION FILED APR. 26, 1905.

WITNESSES:
Ralph Lancaster
Russell M. Everett

INVENTOR
Henry Fredrick,
BY
Charles H. Sell,
ATTORNEY

No. 818,430.  
PATENTED APR. 24, 1906.
H. FREDRICK.  
WATER METER.  
APPLICATION FILED APR. 26, 1905.
5 SHEETS—SHEET 2.
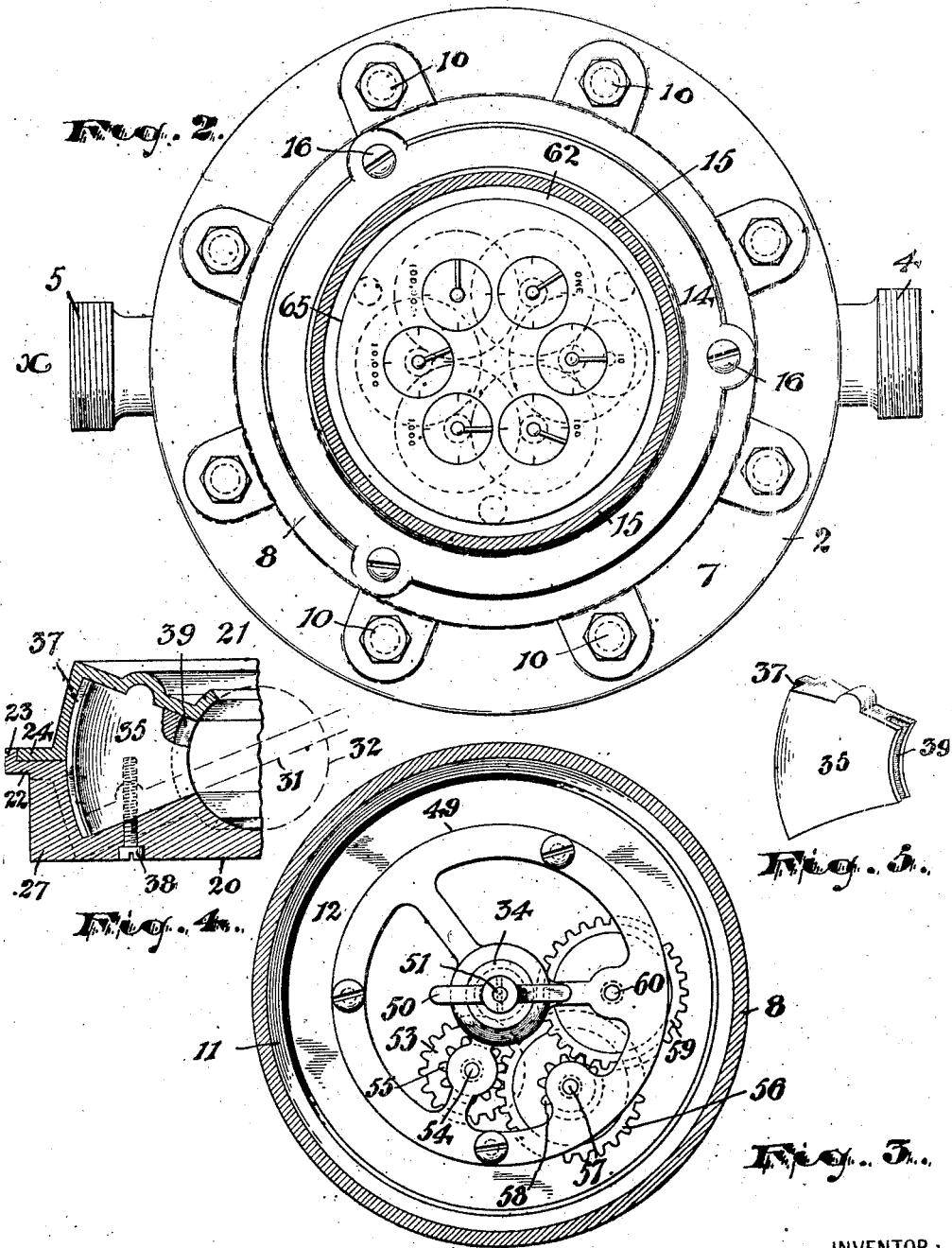
WITNESSES:  
Ralph Lancaster  
Russell M. Everett
INVENTOR:  
Henry Fredrick  
BY Charles H. Pell,  
ATTORNEY.

No. 818,430. PATENTED APR. 24, 1906.
H. FREDRICK.
WATER METER.
APPLICATION FILED APR. 26, 1905.

5 SHEETS—SHEET 3.

WITNESSES:
Ralph Lancaster
Russell M. Everett

INVENTOR:
Henry Fredrick,
BY
Charles H. Pell,
ATTORNEY.

No. 818,430. PATENTED APR. 24, 1906.
H. FREDRICK.
WATER METER.
APPLICATION FILED APR. 26, 1905.

5 SHEETS—SHEET 4.

WITNESSES:
Ralph Lancaster
Russell M. Everett

INVENTOR:—
Henry Fredrick,
BY
Charles H. Pell
ATTORNEY.

No. 818,430. PATENTED APR. 24, 1906.
H. FREDRICK.
WATER METER.
APPLICATION FILED APR. 26, 1905.

5 SHEETS—SHEET 5.

WITNESSES
Ralph Lancaster
Russell M. Everett

INVENTOR
Henry Fredrick,
BY Charles H. Pell,
ATTORNEY.

UNITED STATES PATENT OFFICE.

HENRY FREDRICK, OF NEWARK, NEW JERSEY.

WATER-METER.

No. 818,430.   Specification of Letters Patent.   Patented April 24, 1906.

Application filed April 26, 1905. Serial No. 257,431.

*To all whom it may concern:*

Be it known that I, HENRY FREDRICK, a citizen of the United States, residing at Newark, in the county of Essex and State of New Jersey, have invented certain new and useful Improvements in Water-Meters; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates to water-meters, and more particularly to water-meters of that class known as the "disk" type.

The objects of the present improvements are to admit water only to the disk and not to the gearing of the meter, to obviate wear of the disk upon the septum, to exclude grit or other foreign matter from the bearing of the disk upon the floor of its chamber, to secure a more perfect balancing or equilibrium of the disk, to obtain a sensitive and delicate action of the disk, to secure a support of the counter which will permit the insertion of different gears, to obtain great accuracy in the meter and great simplicity and durability in its construction, and to secure other advantages and results, some of which may be referred to hereinafter in connection with the description of the working parts.

The invention consists in the improved water-meter and in the arrangements and combinations of parts of the same, all substantially as will be hereinafter set forth, and finally embraced in the clauses of the claim.

Figure 1:
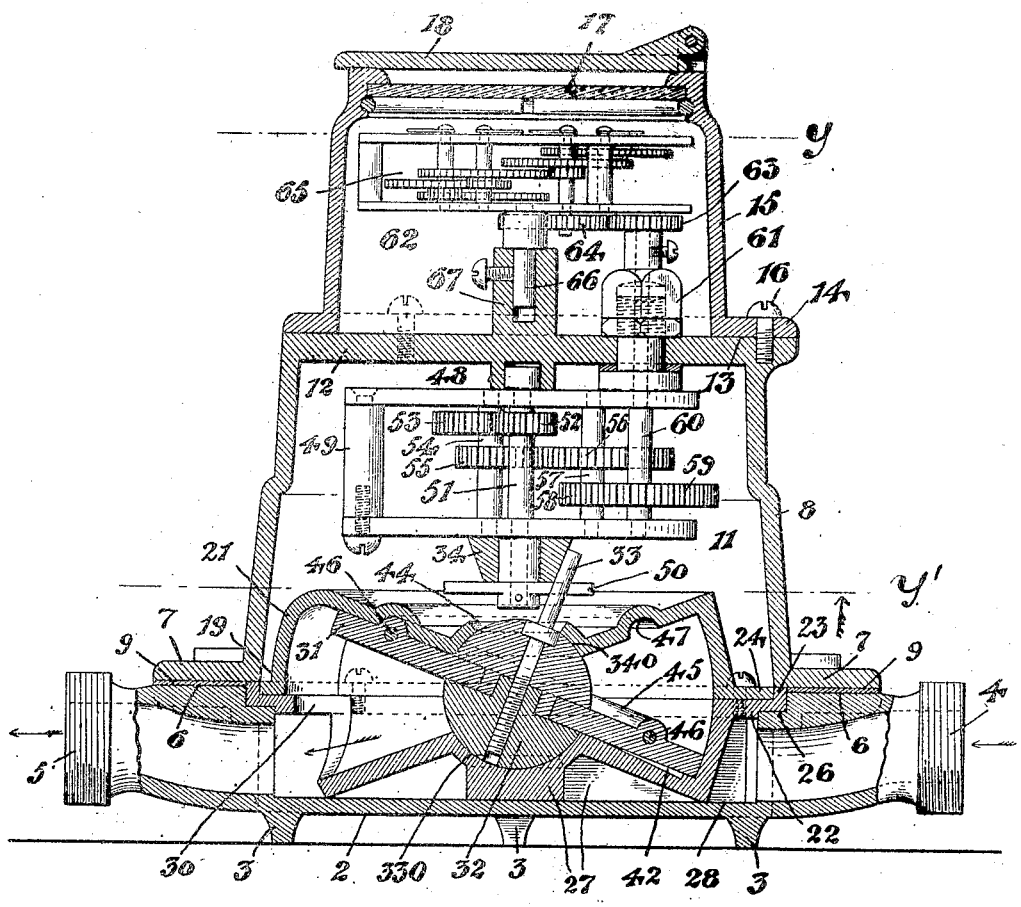
Figure 7:
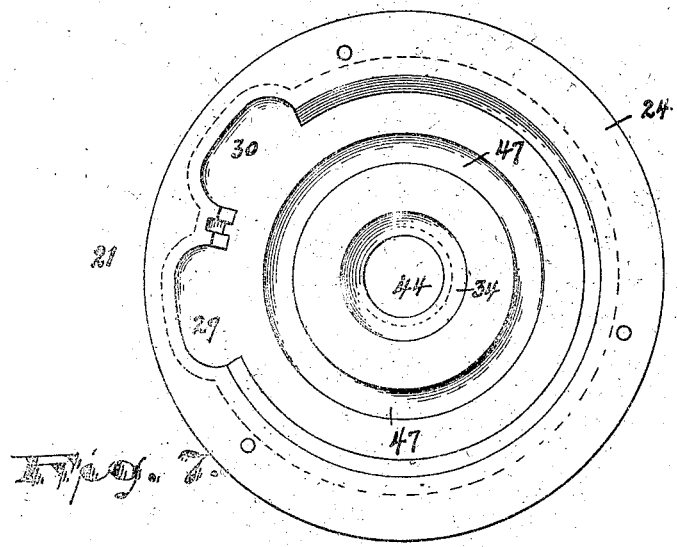
Figure 6:
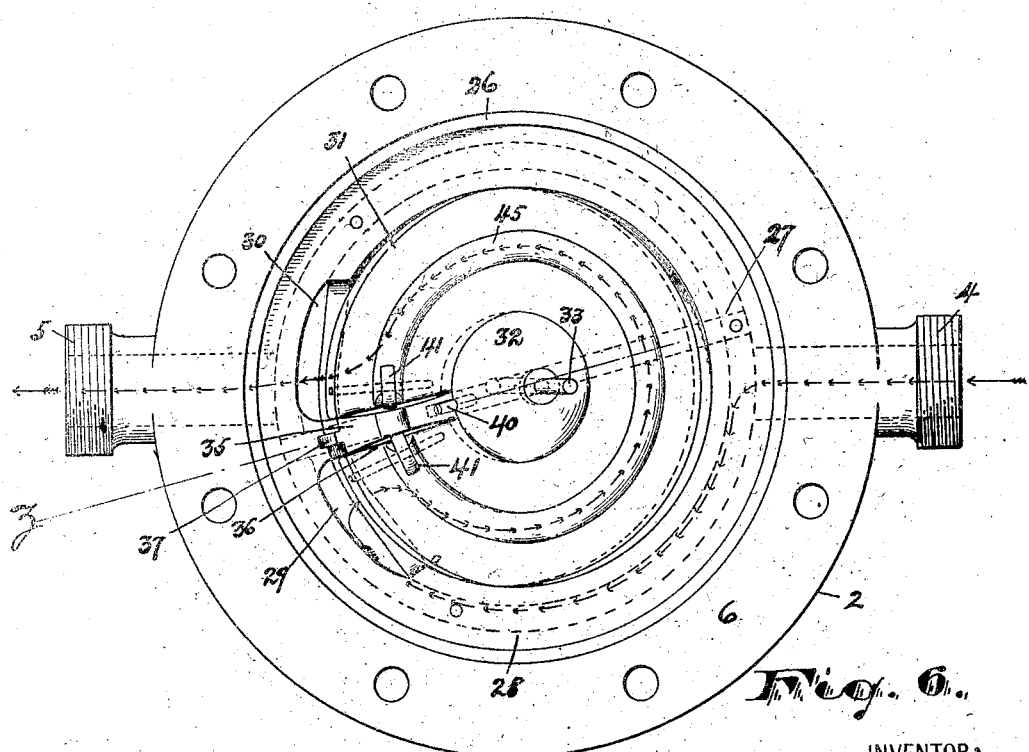
Figure 10:
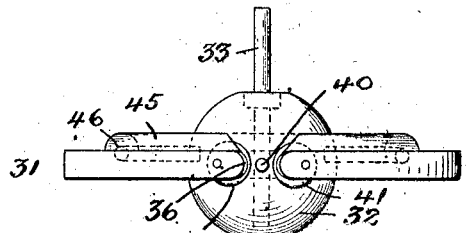
Figure 9:
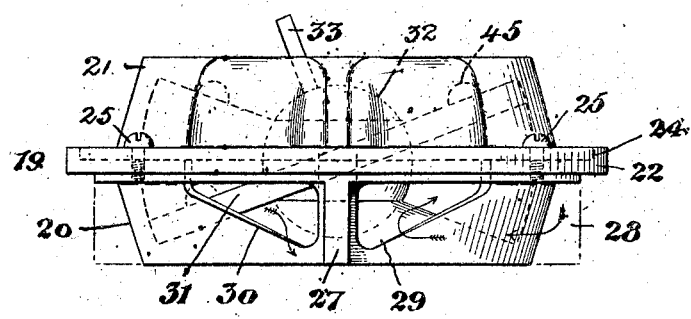
Figure 8:
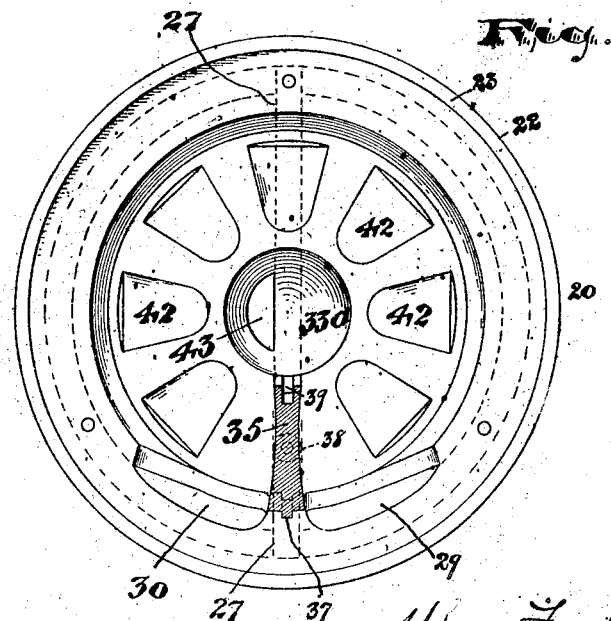
Figure 11:
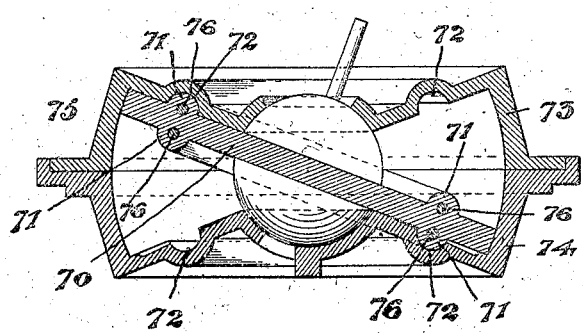
Figure 12:
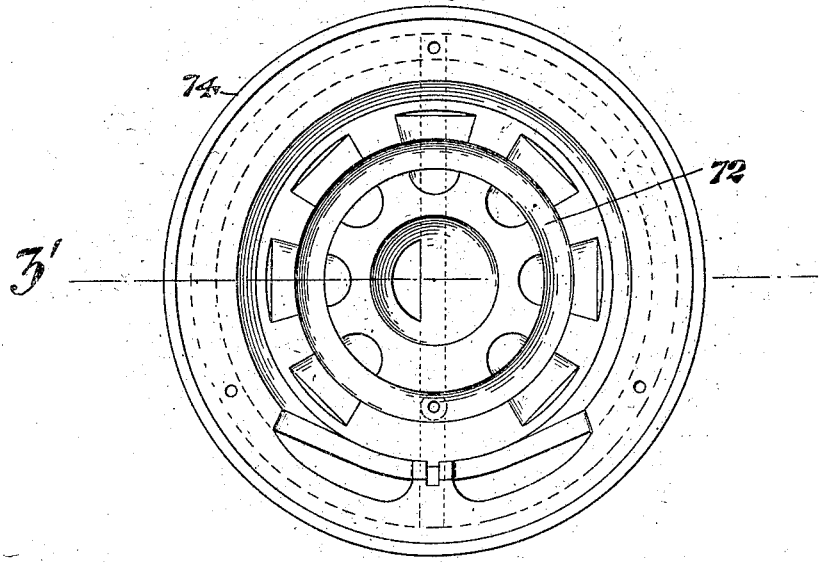

Referring to the accompanying drawings, in which like numerals of reference indicate corresponding parts in each of the several figures, Figure 1 is a vertical central section of my improved water-meter, taken through the inlet and outlet ports, as on line $x$, Fig. 2. Fig. 2 is a sectional view of the meter, taken upon line $y$, Fig. 1. Fig. 3 is a similar section upon line $y'$, Fig. 1, looking upward. Fig. 4 is a detail section, as upon line $z$, Fig. 6, of a certain septum or partition. Fig. 5 is a perspective view of said septum detached. Fig. 6 is a plan of the base portion of the meter, everything above the disk-chamber being removed. Fig. 7 is an inner face view of the upper section of the disk-chamber detached. Fig. 8 is a similar view of the lower section of said chamber. Fig. 9 is an edge view of the disk-chamber removed from the meter and showing the inlet and outlet ports thereof. Fig. 10 is an edge view of the disk. Fig. 11 is a vertical section upon the plane indicated by line $z'$, Fig. 12, of a modified form of disk and disk-chamber sometimes employed; and Fig. 12 is a plan of the lower section of the disk-chamber of such modified construction.

In said drawings, 2 indicates the bottom portion of the body or casing of my improved meter, said portion having feet 3 for the meter to stand upon and at opposite sides of itself being provided with an inlet 4 and an outlet 5, both adapted to receive pipe connections in any ordinary and suitable manner. Said bottom portion 2 provides at its upper side an annular bearing portion 8 of the meter-casing, a gasket 9 being placed between the flange 7 and bearing 6 and then said parts joined by bolts to form a tight joint. Said middle section 8 of the casing provides interiorly a gear-chamber 11 and has a closed top 12, forming at its upper and outer margin a bearing-surface for the flange 14 of the top section 15 of the meter, said sections being connected, as by screws 16. This upper section 15 incloses the counter and at its upper part has a glass 17 and above the same a hinged metal cover 18, as is common in the art.

Within the bottom section 2 of my improved meter is arranged the disk-chamber 19, which is shown in detail in Figs. 7, 8, and 9. Said disk-chamber comprises a lower section 20 and an upper section 21, both of which are dish-shaped and adapted to be placed with their openings together to inclose the disk. To form this joint, each of the sections is provided at its edges with a peripheral flange, one of which flanges, preferably the flange 22 of the lower section, has a raised rib 23 at its outer edge, so as to form a recess adapted to receive the flange 24 of the upper section, said flanges then being fastened together, as by screws 25.

The bottom part 2 of the meter-casing provides a central recess to receive the said disk-chamber 19, and the upper edges of said recess are themselves recessed, as at 26, to receive the joined flanges 22 24 of the disk-chamber. Said recess 26 extends outward beyond the inner edge of the flange 7 of the middle section 8 of the meter-casing, so that the said middle section 8 at its lower edge overlaps the flanges of the disk-chamber and when clamped to the bottom section 2 holds said disk-chamber in place, as shown in Fig. 1.

The disk-chamber is set at its bottom upon the floor of the recess of the bottom section 2 of the meter-casing, and said chamber is sufficiently smaller than the said recess to form around itself a water-passage, which is thus in communication with the inlet and outlet ports 4 5. The lower section of the disk-chamber is provided with an exterior diametric partition 27, which at two opposite sides of the disk-chamber stops or closes the water-passage above referred to, so that the inlet 4 is divided or separated from the outlet 5. Said partition forms a very small angle with the line of said inlet and outlet ports, as shown more particularly in Fig. 6, and whereby its ends which close the water-passage are closely adjacent to said ports. Water flowing inward at port 4 therefore enters close to the said partition 27, as shown by the arrows in said Fig. 8, and continues through the passage 28 almost half-way around the chamber until it reaches an opening 29 through the wall of the lower section of the disk-chamber closely adjacent to the other end of the partition 27. Here the water enters the disk-chamber and after passing almost entirely around the same escapes through an exit 30 on the opposite side of the partition 27 from the entrance 29, and so passes to the outlet-port 5. It will be noticed that in this circuit of the water it is confined within a restricted passage and cannot either enter the gear-chamber or otherwise diffuse itself where its force will effect no useful purpose.

Within the disk-chamber is mounted the disk 31, said disk comprising a central ball 32, which has bearings 33 34 in the upper and lower sections 21 20 of the disk-chamber. The said disk has the same gyratory movement with the exception of not rotating, which is common in meters of this type, and the top and the bottom walls of the disk-chamber are shaped as upon the surfaces of cones whose apices are adjacent, the inclination of said walls being such that the disk will in any position lie tangent at the opposite ends of a diameter to the said top and bottom walls. The side walls are furthermore rounded or curved to fit closely, but without friction, against the periphery of the disk throughout its entire cycle. The said disk itself in my present construction is a flat or plane, by which construction increased simplicity in manufacture is secured, and, furthermore, an increase of power obtained in said disk.

From the ball 32 a spindle 33 projects upward through a circular opening in the top of the disk-chamber and at its upper end bears laterally against a conical block 34, supported centrally above the ball 32 in the gear-chamber above. This tips the disk to one side, so that its under surface at that side will come in contact with the bottom of the chamber, while the upper face on the opposite side will come in contact with the top of the chamber. The said disk in any position therefore cuts off the inlet-port 29 from the outlet-port 30, so that water pouring into the disk-chamber crowds against the under face of the disk, and as it sweeps around the disk-chamber in its course to the outlet-port it exerts a forwardly-moving wedging force upon the disk. The disk of course cannot tip because of its spindle 33, and therefore it describes the gyratory movement above referred to—that is to say, its faces roll around the upper and lower walls of the disk-chamber while the spindle circles about the block 34. As the disk-tips pass the inlet-port water enters above the disk and exerts a downward pressure at points diametrically opposite the upward pressure just referred to and which continues the motion of the disk.

To insure the water coursing around the disk-chamber and prevent it cutting directly across from the inlet-port 29 to the outlet-port 30, a septum or partition 35 is vertically and radially disposed in the disk-chamber between said inlet and outlet ports, and the disk 31 is slotted, as at 36, to receive said septum. This septum, as shown more particularly in Figs. 4 and 5, has a rib 37 at its outer edge adapted to enter a corresponding groove in the side wall of the disk-chamber, and at its bottom receives a fastening-screw 38, projecting upward through the bottom of the disk-chamber. The inner edge of the septum fits against the ball 32 and is vertically slotted, as at 39, to receive a radially-projecting pin 40 upon the said ball, whereby the said pin holds the edges of the slot 36 in the disk away from the septum and prevents the frictional wear which would be otherwise occasioned on said parts to the retardation of action and sacrifice of sensitiveness, especially where the water-pressure is low. To further conduce to an easy and efficient movement of the disk 31, the slot 36 has branching from opposite sides of itself other slots, in which are pivoted antifriction wheels or rollers 41, set therein so as to project slightly at their peripheries into engagement with the sides of the septum, the pivotal pins or arbors for said friction-wheels having a bearing in both opposite side walls of the branch slot, as shown.

In the floor of the disk-chamber I preferably form radially-disposed depressions or pockets 42, which taper in depth from nothing at their inner ends to an appreciable depth at their outer ends. These pockets are adapted to receive and hold any grit which finds its way into the disk-chamber and which would otherwise be either swept around and around the chamber, acting to grind or wear off the edges of the disk or else would stop the disk entirely. In many cases heretofore the grit getting into the lower side of the disk and disk-chamber held the disk stationary and put it out of action, thus causing expense. By my construction the pockets receive and hold the accumulation of grit until a convenient time for cleaning them out. Said grit-pockets also give more effect to the disk under a low pressure of water by creating more motion and action of the water.

The seat or socket 330 for the ball 32 in the bottom of the disk-chamber is preferably closed at the inlet side of the transverse partition 27, but may, if desired, be left open, as at 43, on the discharge or exit side. At the top of the disk-chamber is an opening 44 for the spindle 33; but the ball 32 forms with the walls of the recess 340 around the said opening a sufficiently tight joint to prevent any appreciable flow of water upward.

The disk 31 in my improved construction is, as above stated, made flat or plane, and upon its upper side I prefer to form an annular rib 45, which is semicircular in cross-section. Furthermore, in molding the disk, which is usually made of hard rubber, I mold within the said rib 45 a wire 46. This annular rib 45 and its inclosed wire 46 serve not only to strengthen and stiffen the disk, but further give to it a better equilibrium or balance, because I provide in the top of the disk-chamber a groove 47, adapted to receive and nicely fit the said rib 45. Obviously, therefore, as the disk gyrates or moves the said rib lies at some point of itself within the groove 47, as shown in Fig. 1, and hence its movement is greatly steadied or balanced.

Within the gear-chamber 11, formed by the middle section 8 of the meter casing, is supported, as at 48, a frame 49, in which is mounted a train of gearing adapted to transmit motion from the spindle 33 to the counting or recording mechanism. Below the conical block 34 is a cross-piece 50, being fast upon a shaft of the gearing 51 and transmitting its motion through pinion 52, gear 53, shaft 54, pinion 55, gear 56, shaft 57, pinion 58, and gear 59 to a shaft 60, which projects through a stuffing-box 61 on the top 12 of the gear-chamber into the counter-chamber 62 above, and which is formed by the top section 15 of the meter-casing. Upon the upper end of said shaft 60 is a gear-wheel 63, adapted to intermesh with the driving-gear 64 of a counter 65 of any usual and well-known construction. Said counter, however, in my improved construction I support by a bottom center pin 66, which is inserted in a socket 67 upon the top 12 of the middle section of the casing. This enables the counter to be rotated or turned upon the said pin, so that its driving-gear 64 can be made to engage different-sized gears upon the shaft 61, as desired.

It will be noted that the gear-chamber 11 is by my improved construction independent of the passages by which the water flows through the meter, and therefore said flow of water does not impede the action of said gearing either by impact against the same or by accumulating grit therein. Great delicacy of action and efficiency of the meter is thus promoted. It will be further understood that by the means above described I secure a meter which will register upon a very low water-pressure and with accuracy, so that in cities where the pressure is not high there may still be an effective measurement. The meter also does not, therefore, so often have to be taken out and examined because of stopping and failing entirely to register, and both labor and the loss of non-measured flow is avoided.

Under some conditions I may employ, as illustrated in Figs. 11 and 12, a disk 70, having annular ribs 71 71, upon both its upper and lower surfaces, and which ribs work in correspondingly-shaped grooves 72 72 in the top and bottom sections 73 74, respectively, of the disk-chamber 75. Each rib contains an embedded wire 76, as before described, and the disk-chamber and disk are in all other respects than those just noted the same as was before described. By having two ribs or ribs upon both its upper and lower sides, the disk is always steadied at two diametrically opposite points, since each rib is always in engagement at some point with its groove. More perfect equilibrium and greater delicacy of action are thus secured.

Having thus described the invention, what I claim as new is—

1. In a water-meter, a bottom section having a central recess provided with an inlet and an outlet for water, a disk-chamber seated in said recess and being at its lower part smaller than the recess so as to form therewith an annular space or passage, said disk-chamber having partitions adapted to close said passage-way between the inlet and outlet and having ports on opposite sides of the partition farthest from the inlet, a disk in said chamber, a gear-chamber above said disk-chamber and entirely closed off thereby from the recess of the bottom section, gears in said gear-chamber adapted to be actuated by said disk, and registering means in connection with said gears.

2. In a water-meter, a bottom section having a central recess with an inlet and an outlet leading thereto, a middle section providing a gear-compartment, a disk-chamber mounted in the mouth of said recess and separating said recess from the gear-chamber above, said disk-chamber engaging the bottom of the recess and being at its lower part smaller than the same to form therewith an annular passage and having in its side entrance and discharge ports, radial partitions upon said disk-chamber dividing the said annular passage and placing the parts in communication with each other through the disk-chamber, a disk in said disk-chamber, gears in said gear-compartment adapted to be actuated by said disk, and registering mechanism in connection with said gears.

3. In a water-meter, a casing having a bottom section providing a disk-chamber recess with water-inlet and discharge-passages at the sides thereof, and a middle section provided with a closed top and an open bottom adapted to be secured upon said bottom section around the said recess thereof, a disk-chamber seated in the mouth of said recess and thus serving also to divide the said water-passages from the chamber of the middle section, a disk in said disk-chamber, gearing in the said middle-section chamber in connection with said disk, and counter mechanism in connection with said gearing.

4. In a water-meter, a casing having a bottom section providing a disk-chamber recess with water-inlet and discharge-passages at the sides thereof, and a middle section provided with a closed top and an open bottom adapted to be secured upon said bottom section around the said recess thereof, a disk-chamber seated in the mouth of said recess and dividing the water-passages of the bottom section from the chamber of the middle section, said disk-chamber providing interior ball-seats in the center of its top and bottom walls, the upper of which seats is apertured, a disk in said chamber having a ball lying in said seats and permitting a limited leakage into the middle-section chamber, gearing in said middle-section chamber in connection with said disk, and counter mechanism in connection with said gearing.

5. In a meter, a casing providing a counter-chamber with a vertical socket therein, a counter in said chamber having a central bottom pin adapted to enter said socket, a driving-shaft projecting upward into said counter-chamber, gears upon said shaft and counter, respectively, adapted to intermesh, and means adapted to receive motion from the water passing through the meter to drive said shaft.

6. In a water-meter, a casing, a disk-chamber having a conical floor provided with a plurality of radially-extending grit pockets or recesses, each independent of the others and having its depth increasing from nothing at the end next the center of the disk-chamber outward, a disk in said disk-chamber, and registering mechanism adapted to be operated by said disk.

7. In a disk water-meter, a casing providing a disk-chamber, a disk in said chamber having upon one of its faces an annular rib, means for conducting water to and from said chamber, and registering mechanism adapted to be actuated by said disk.

8. In a disk water-meter, a casing providing a disk-chamber, a disk in said chamber having upon its face an annular projecting rib, a wire embedded in said rib, means for conducting water to and from said chamber, and registering mechanism adapted to be actuated by said disk.

9. In a disk water-meter, a casing providing a disk-chamber, a disk in said chamber having upon its face an annular projecting rib, the disk-chamber having a groove to receive said rib, means for conducting water to and from said chamber, and registering mechanism adapted to be actuated by said disk.

10. In a disk water-meter, a casing providing a disk-chamber having in its wall a circular groove, a flat disk having an annular rib nicely fitting said groove, a wire embedded in said rib, means for conducting water to and from said chamber, and registering mechanism adapted to be actuated by said disk.

11. In a disk water-meter, a casing providing a disk-chamber, a radial septum in said chamber having its sides or faces concaved and its inner end edge vertically slotted, a disk in said chamber having a center ball and a radial slot of greater width than the thickness of the said septum, a projection upon the center ball of the disk adapted to enter the end edge slot of the septum and take the friction between said disk and septum, means for conducting water to and from said chamber, and registering mechanism adapted to be actuated by said disk.

12. In a disk water-meter, a casing providing a disk-chamber, a radial septum in the chamber, a disk mounted in said chamber and having a radial slot adapted to receive said septum and a branch slot leading from one side of said main slot, a friction-wheel in said branch slot, an arbor-pin for said friction-wheel having bearings in the opposite walls of said branch slot, and registering means adapted to be operated by said disk.

13. In a disk water-meter, a casing providing a disk-chamber, a radial septum in the chamber having its side or face concaved, a disk mounted in said chamber and having a radial slot adapted to receive said septum and a branch slot leading from the main slot at the concaved side of the septum, a friction-wheel in said branch slot, an arbor-pin for said friction-wheel having bearings in the opposite walls of said branch slot, and registering means adapted to be operated by said disk.

14. In a disk water-meter, a casing providing a disk-chamber, a radial septum in the chamber, a disk mounted in said chamber and having a radial slot adapted to receive said septum, and branch slots leading from opposite sides of said main slot, friction-wheels one in each of said branch slots, an arbor-pin for each friction-wheel having bearings in the opposite walls of the branch slot, and registering means adapted to be operated by said disk.

15. In a disk water-meter, a casing providing a disk-chamber having in its top and bottom walls annular grooves, a disk in said chamber provided on its upper and lower surfaces with ribs adapted to fit said grooves, means for conducting water to and from said chamber, and registering mechanism adapted to be actuated by said disk.

16. In a disk water-meter, a casing providing a disk-chamber having in its top and bottom walls annular grooves, a flat disk in said chamber provided on its upper and lower surfaces with ribs adapted to fit said grooves, wires embedded in said ribs, means for conducting water to and from said chamber, and registering mechanism adapted to be actuated by said disk.

17. In a disk water-meter, a casing providing a disk-chamber, a disk in said chamber having upon its opposite faces annular ribs, and registering means adapted to be actuated by said disk.

18. In a disk water-meter, a casing providing a disk-chamber, a disk in said chamber having upon its opposite faces annular ribs, wires embedded one in each rib, and registering means adapted to be operated by said disk.

19. In a disk water-meter, a casing providing a disk-chamber, a disk in said chamber having an annularly-disposed strengthening-wire embedded in itself, and registering means adapted to be actuated by said disk.

In testimony that I claim the foregoing I have hereunto set my hand this 14th day of April, 1905.

HENRY FREDRICK.

Witnesses:
RUSSELL M. EVERETT,
M. V. DOYLE.